United States Patent
Yu et al.

(10) Patent No.: US 6,456,726 B1
(45) Date of Patent: Sep. 24, 2002

(54) METHODS AND APPARATUS FOR MULTI-LAYER DATA HIDING

(75) Inventors: Hong Heather Yu, Plainsboro; Min Wu; Xin Li, both of Princeton, all of NJ (US); Alexander D. Gelman, Brooklyn, NY (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/427,321

(22) Filed: Oct. 26, 1999

(51) Int. Cl.[7] .............................. G06K 9/00; H04L 9/00; H04N 11/00
(52) U.S. Cl. ..................... 382/100; 713/176; 348/463
(58) Field of Search ................................ 382/100, 248, 382/250; 380/54; 713/176; 348/460–468

(56) References Cited

U.S. PATENT DOCUMENTS

| | | | |
|---|---|---|---|
| 5,499,294 A | | 3/1996 | Friedman |
| 5,825,892 A | * | 10/1998 | Braudaway et al. .......... 380/51 |
| 5,862,260 A | | 1/1999 | Rhoads |
| 5,905,248 A | * | 5/1999 | Russell et al. ............... 235/462 |
| 5,905,800 A | | 5/1999 | Moskowitz et al. |
| 5,905,819 A | * | 5/1999 | Daly .......................... 382/284 |
| 6,128,736 A1 | * | 2/2001 | Miller ........................ 713/176 |
| 6,185,312 B1 | * | 2/2001 | Nakamura et al. .......... 382/100 |
| 6,192,138 B1 | * | 2/2001 | Yamadaji .................... 382/100 |
| 6,205,249 B1 | * | 3/2001 | Moskowitz ................. 382/232 |
| 6,243,480 B1 | * | 6/2001 | Zhao et al. ................. 382/100 |

FOREIGN PATENT DOCUMENTS

| | | |
|---|---|---|
| EP | 0 840 513 A2 | 5/1998 |
| EP | 0 860 997 A2 | 8/1998 |
| EP | 0 901 282 A2 | 3/1999 |
| EP | 0 903 943 A2 | 3/1999 |

OTHER PUBLICATIONS

Don Coppersmith, Fred Mintzer, Charles Tresser, Chai Wah Wu and Minerva M. Yeung, "Fragile Imperceptible Digital Watermark with Privacy Control", Jan. 1999, Part of the IS&T/SPIE Conference on Security and Watermarking of Multimedia Contents, SPIE vol. 3657 0277–786–X/99, pp. 79–84.

* cited by examiner

Primary Examiner—Amelia M. Au
Assistant Examiner—Martin Miller
(74) Attorney, Agent, or Firm—Harness, Dickey & Pierce, P.L.C.

(57) ABSTRACT

A data hiding system and method for providing a method of embedding multiple layers of hidden data into multimedia data. First, a media unit of the multimedia data is evaluated to determine an appropriate embedding procedure. Next during a first embedding pass, a ruling layer of primary hidden data is embedded into the media unit. In another embedding pass, a governing layer of secondary hidden data is embedded on top of the ruling layer. The secondary hidden data provides control information for controlling the primary hidden data and the host data. Control information such as error correction data, synchronization data, decoding data, and authentication data is embedded in the governing layer. Embedding schemes such as base domain and spectrum domain embedding are employed.

22 Claims, 3 Drawing Sheets

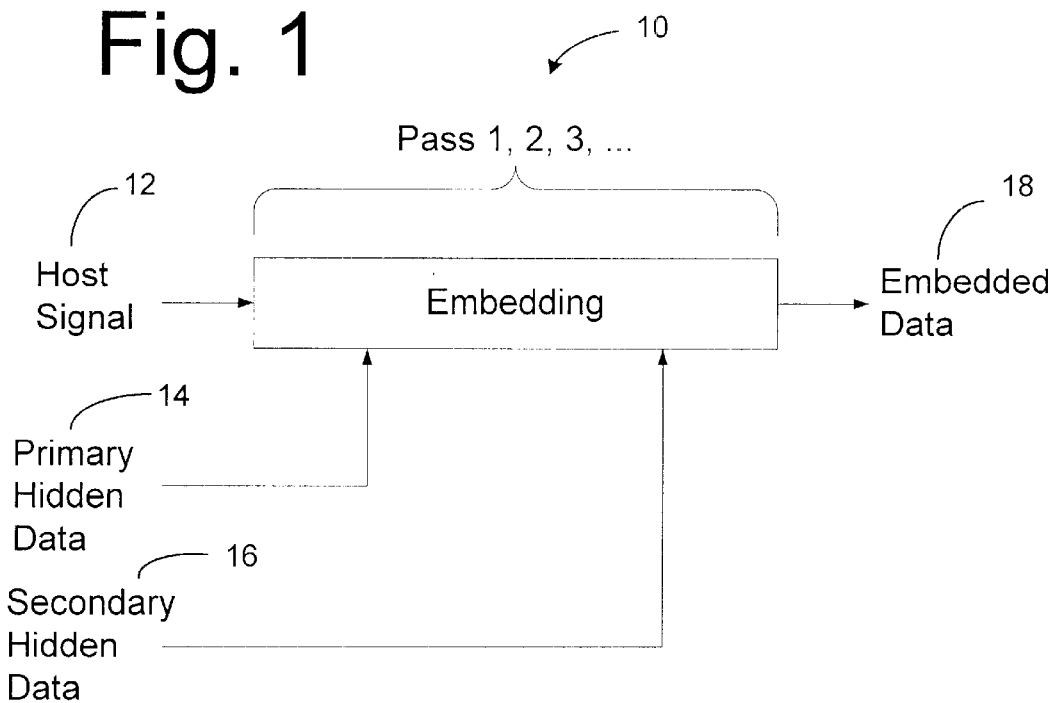
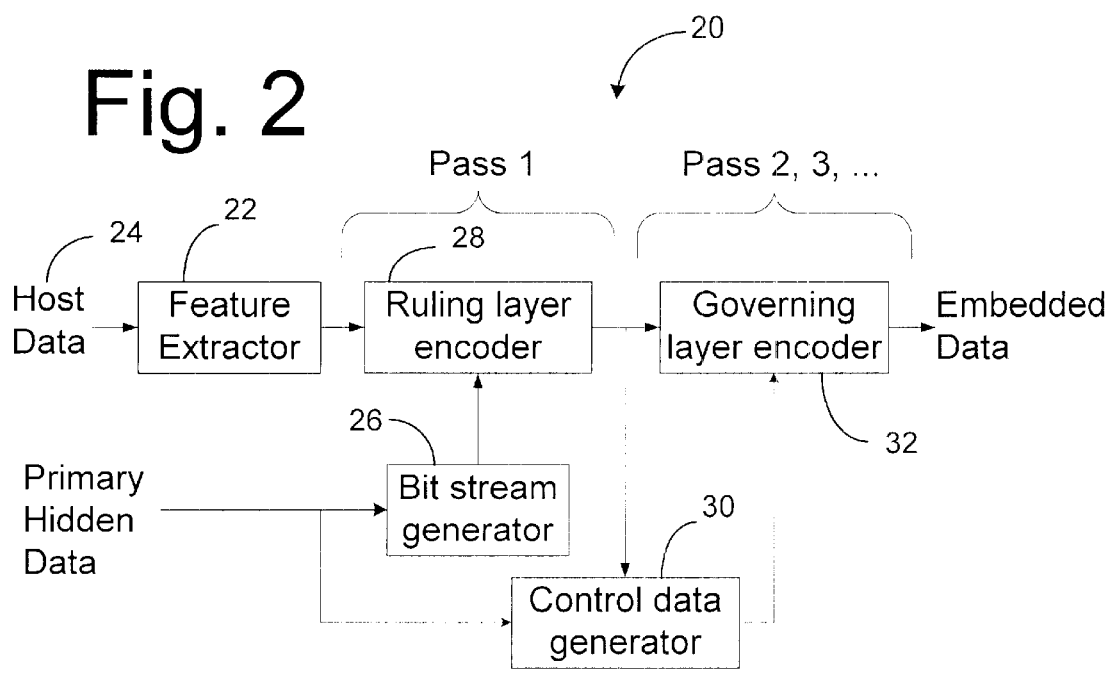

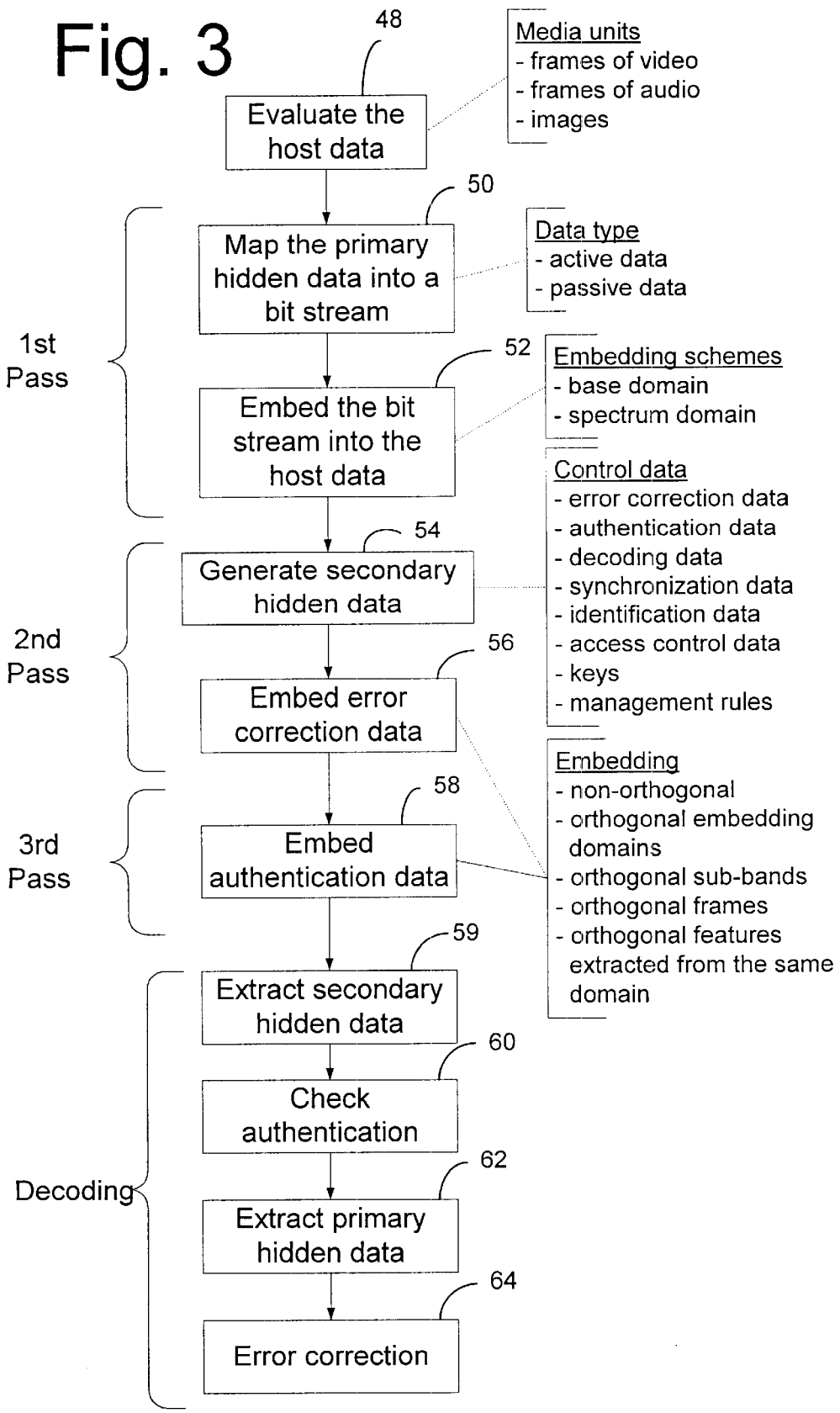

METHODS AND APPARATUS FOR MULTI-LAYER DATA HIDING

BACKGROUND AND SUMMARY OF THE INVENTION

The present invention relates generally to systems for hiding data in media and more specifically to a system for multi-layer data hiding in multimedia signals.

With the increasing spread in electronic commerce, there has been a commensurate increase in electronic copying technology. Digital copy technology such as DVD-R, DVD-RW, CD-R, and CD-RW is now widely available. Ensuring the protection of electronic media from unauthorized copying and modification continues to become more important as electronic commerce continues to spread into every area of the national economy. Electronic networks such as the Internet have now become a commonplace medium for conducting the nations' business, including activities such as the sale of various forms of multimedia products. Examples of multimedia products that can be purchased over the Internet include video and audio compositions as well as images. Also, the mere distribution of multimedia products in a digital format such as CD-ROM and DVD disks exposes the product to potential copying. In an attempt to ensure the secure distribution of multimedia products, content protection mechanisms are increasingly being employed.

Data hiding is one form of content protection that is sometimes employed for copy control and copyright protection. The single pass embedding of passive data such as a watermark into a host medium is one example of data hiding. An embedded watermark is typically intended to provide copyright control and access control of the multimedia product. Unfortunately, present forms of data hiding suffer from numerous drawbacks that reduce the effectiveness of the intended protection and sometimes make the protection technique untenable in real-life applications.

Conventional single pass techniques of embedding one layer of hidden data into a host signal for controlling the use of the host signal generally result in inconsistent protection. In some situations, after unauthorized copying of the host data a false positive signal is received indicating that the pirated copy is an authorized product. Moreover, single pass/single layer techniques can only fulfill (and most likely just partially fulfill) a single purpose, such as ownership protection, access control, and annotation. In addition, controllability of the embedded hidden data is generally not feasible. With regards to capacity, previous single pass/single layer techniques usually are only good for the ideal case such as when images are of same size and when the same amount of data is embedded into each frame of video data.

The present data hiding system and method provides a method for embedding multiple layers of hidden data into multimedia data. First, a media unit of the multimedia data is evaluated to determine an appropriate embedding procedure. Next during a first embedding pass, a ruling layer of primary hidden data is embedded into the media unit. In another embedding pass, a governing layer of secondary hidden data is embedded on top of the ruling layer. The secondary hidden data provides control information for controlling the primary hidden data and the host data.

BRIEF DESCRIPTION OF THE DRAWINGS

FIG. 1 is a flow diagram of a multi-layer data hiding system that incorporates the principles of the present invention;

FIG. 2 is a block diagram illustration of an embodiment of a data hiding system;

FIG. 3 is a flow diagram of a presently preferred embodiment of a method of data hiding;

DETAILED DESCRIPTION OF THE PREFERRED EMBODIMENT

Figure 4:
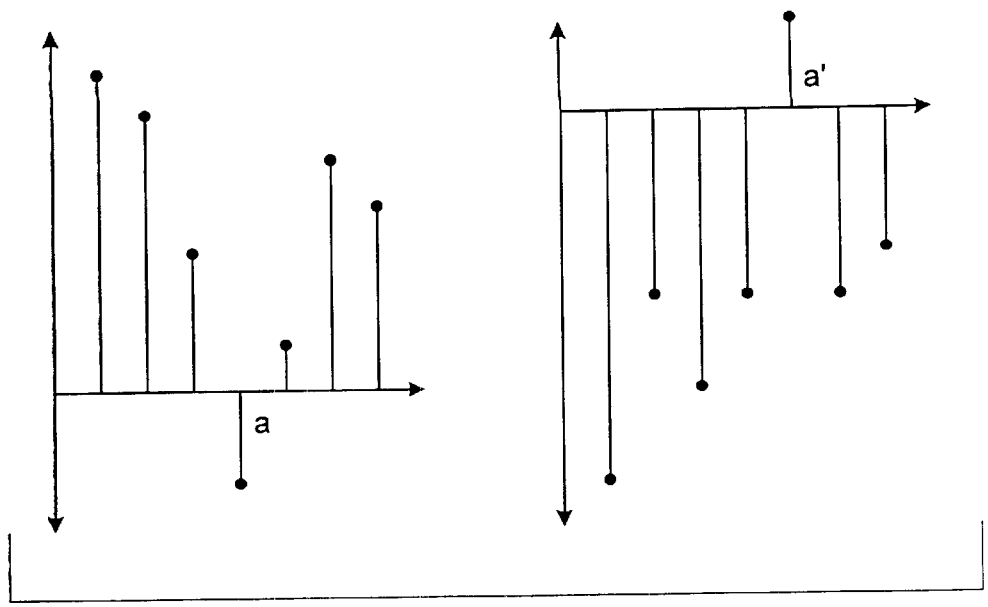
FIG. 4 is a diagram of singular points.

Referring to FIG. 1, an exemplary multi-layer data hiding system 10 is illustrated. Data hiding is defined as imposing a meaningful and extractable but perceptually invisible or inaudible signal onto a host signal. For example, embedding a watermark into a frame of video data. During a first pass, primary hidden data 12 is embedded into a host signal 14 comprised of host data. The primary hidden data consists of passive data such as a watermark, or active data such as an executable or a Java applet. The host data is multimedia data such as digital video, digital audio, and images. During a subsequent pass, secondary hidden data 16 is embedded on top of the layer containing the primary hidden data, resulting in an embedded data signal 18. The secondary hidden data is preferably control information such as error correction data, authentication data, identification data, access control data, keys, management rules, and synchronization data for controlling the primary hidden data as well as the host data. However, embedding non-control data during the second pass is also envisioned, for example when the second layer data requires a more robust embedding scheme than the first layer. Employing embedding schemes such as base domain embedding and spectrum domain embedding to embed the primary and secondary hidden data are within the scope of the invention. The layers of secondary hidden data are preferably embedded with an embedding technique such that the layer of data is orthogonal to prior layers. By ensuring that the data layers are non-overlapping, interference between embedded bits is avoided. Notice that, although orthogonality may be the optimum choice in most cases, the layers may also be non-orthogonal in some applications, so long as the rate of false extraction is within a tolerable threshold. Finally, during decoding of the embedded data the hidden information is extracted and used for purposes such as information retrieval, copyright protection, and fraud tracking.

Although the above embodiment employs a sequential multi-pass embedding system, it is within the scope of the invention to employ a nonsequential multi-pass system to implement the multi-layer data hiding systems. For example, the error correction bits may be hidden simultaneously with the authentication bits, or the access control bits may be hidden with identification bits in the same pass in another case.

There are numerous embedding techniques for ensuring multi-orthogonal data embedding, such as using orthogonal features extracted from the same domain such as a frame, orthogonal subbands, orthogonal frames, and orthogonal embedding domains. By embedding the data layers with orthogonal features, interference between layers of embedded bits is avoided.

The scope of the invention encompasses using multi-level data hiding techniques on individual data layers. Multi-level data hiding techniques involve selecting an embedding scheme for a data layer based upon the quantity of distortion to which the data layer is subjected. Multi-level data hiding begins with classifying the available embedding schemes into categories based upon whether knowledge of the original host media will enhance detection performance. Based on this criterion, many existing embedding approaches can be categorized as either insertional schemes or relationship enforcement schemes. In insertional schemes, the information of the secondary data, possibly modulated and/or encoded, is inserted into the host signal either by an additive process or a multiplicative process. Spread spectrum embedding is an example of an insertional scheme. In relationship enforcement schemes, the signal space is partitioned into subsets and each set is mapped to a value of the secondary data. The mapping can be a mapping from either one host component or a combination of host components to one secondary data value. Odd-even embedding is an example of a relationship enforcement scheme. Next, the quantity of expected data distortion is determined. Then, the embedding scheme is selected based upon the expected quantity of distortion. The data is then hidden into the signal using the embedding scheme that is appropriate for the quantity of expected distortion. As an example, spread spectrum embedding is applied to mid-band coefficients to attain high robustness with low capacity, and relationship enforcement is applied to low-band coefficients to attain high capacity with only moderate robustness.

To further illustrate the operation of the data hiding method a series of scenarios in which the method is used will be presented. In scenario 1, a high capacity scenario, an active agent is imperceptibly embedded into a song of 2 minutes duration. Since an applet or an executable file is generally at least 500 bytes, which equates to a 34 bps data hiding bit rate, a high data hiding bit rate is required. One way to attain the required bit rate is to hide the active data into the primary hidden data layer using a base domain embedding scheme. In addition, control data such as authentication bits, error correction bits, synchronization bits, and a user decoding key are embedded into secondary data layers using spectrum domain embedding. Base domain embedding is used for the primary hidden data layer since it has much better decoding performance in terms of speed than spectrum domain embedding. Spectrum domain embedding is used for the secondary hidden data layers since it has higher survivability over compression than does base domain embedding, and with the relatively low number of control bits the difference in encoding/decoding speed is not significant. The control bits, such as the error correction bits, assist in the correct extraction of the active data. With the help of the additional hidden control information, the detector is better able to tell whether there are errors and further correct the errors in the transmitted hidden active data. In addition, the synchronization data helps in aligning the data for more accurate extraction. A higher level of robustness is thus achieved.

In scenario 2, layers containing the lyrics of a song as well as playback control information are embedded into the host medium, the song. In addition, error correction keys, and identification data layers are embedded to assist in the extraction of both the hidden lyrics and the playback control bits. The lyrics are embedded as a ruling layer using base domain embedding. The three control layers are embedded as governing layers also using base domain embedding.

In a third scenario, only copyright information is hidden into the host medium, the song. In this scenario, the most important requirement is to have the hidden data as robust as possible, i.e., make it extractable with common signal processing techniques and yet, be protected from intentional attacks. Therefore, the copyright data is hidden as primary hidden data in a ruling layer using spectrum domain embedding and authentication data is hidden into the base domain as secondary hidden data in a governing layer that is embedded into the song. The secondary hidden data permits the authenticity of the hidden copyright info to be checked to ensure that a false watermark has not been inserted into the medium.

In another scenario, the primary hidden data (such as an active data stream) is encrypted and then embedded into the host signal. In the case where the decryption key needs to be transmitted simultaneously with the primary hidden data, the key is hidden into a secondary hidden data layer. Here, the key, is also encrypted to ensure secure access, and is therefore hidden in a more robust region.

Another scenario is that only access control bits are required. In this case, it is desirable to have the access control bits hidden as robust as possible. A robust data hiding algorithm is selected for embedding the access control bits. A spread spectrum scheme is used to hide the access control data with some error correction and other control bits coupled with the access control data (primary hidden data) into the spectrum domain. This way, maximum robustness of the access control bits is assured.

Referring to FIG. 2, an exemplary multi-layer data hiding system 20 is illustrated. The data hiding system 20 includes a feature extractor 22 for evaluating features within media units of the host data that comprises a host signal 24. For a digital video signal, a media unit includes a single frame of data as well as multiple frames of data. Within the media unit are features such as objects, texture regions, and background. A bit stream generator 16 converts primary hidden data into a bit stream that is coupled to a ruling layer encoder 28. The ruling layer encoder 28 embeds a ruling layer of the bit stream of primary hidden data into the host data 24. The primary hidden data is also coupled to a control data generator 30 that generates control secondary hidden data that contains control information. The control data generator 30 also receives data from the ruling layer encoder in addition to the primary hidden data. The secondary hidden data is sent from the control data generator 30 to a governing layer encoder 32 to be embedded into the host data 24. The governing layer encoder 32 embeds a governing layer of the secondary hidden data on top of the ruling layer, thereby generating embedded data.

Referring to FIG. 3, a presently preferred embodiment of a data hiding method is illustrated. The method uses a three-pass architecture to hide data in digital audio data. Initially, at step 48 the host data media unit is evaluated. In this embodiment, active data is embedded as the primary data. In the first pass, the active agent data stream S is mapped into a sequence of binary data $Sb=Sb_1, Sb_2, \ldots Sb_M$ of length M, step 50, which is inserted imperceptibly into the host signal with base domain embedding, step 52. Then at step 54, error correction bits, $E=E_1, E_2, \ldots E_Q$, are generated and at step 56 embedded into the host signal during the second pass. In the third pass, cryptography techniques are used to authenticate the host signal as well as the embedded hidden agent, step 58. During decoding, at step 59, the control bits are first extracted and at step 60 the authentication of the embedded data is checked. The primary hidden data is then extracted, step 62. Finally, at step 64 the error correction bits are used to check and the validity of the extracted primary hidden data.

Some advantages of using the above exemplary multi-layer data hiding method for audio media include improving the lossless extraction of the active agent by employing authentication and error correction bits, increasing the security of the host data with public key cryptography, the ability to localize alteration (with an authentication layer) and to correct minor alterations to the hidden data (with the authentication and error correction layers), and fast extraction performance assured with base domain embedding of the primary hidden data. Using a perceptual model with the data hiding method further improves the inaudibility of the embedded data.

The embedded active agent can be configured to permit feedback of information to be sent to the server when streaming or online preview is performed, enable renewal of keys or management rules, perform scrambling on the audio signal to prevent further unauthorized use of the content, and allow play-once-preview and also play unlimited times with one-time downloading when the proper key is purchased.

Proper usage of the perceptual model ensures the imperceptibility of the embedded hidden data. The perceptual model takes advantage of the human auditory system's inability to distinguish noise under conditions of auditory masking. That is, the presence of a strong audio signal makes a temporal or spectral neighborhood of weaker audio signals imperceptible. Our empirical study shows that the human ear cannot distinguish the differences when a minor change is made on a singular point or maskee point (under the condition it is still a maskee point before and after the modification). The definitions of singular point, masker point, and maskee point are given below.

Define $I(j)$ to be a singular point iff $sign(I(j))=-sign(I(j-1))$ & $sign(I(j))=-sign(I(j+1))$. FIG. 4 illustrates two singular points a and a'.

Figure 5:
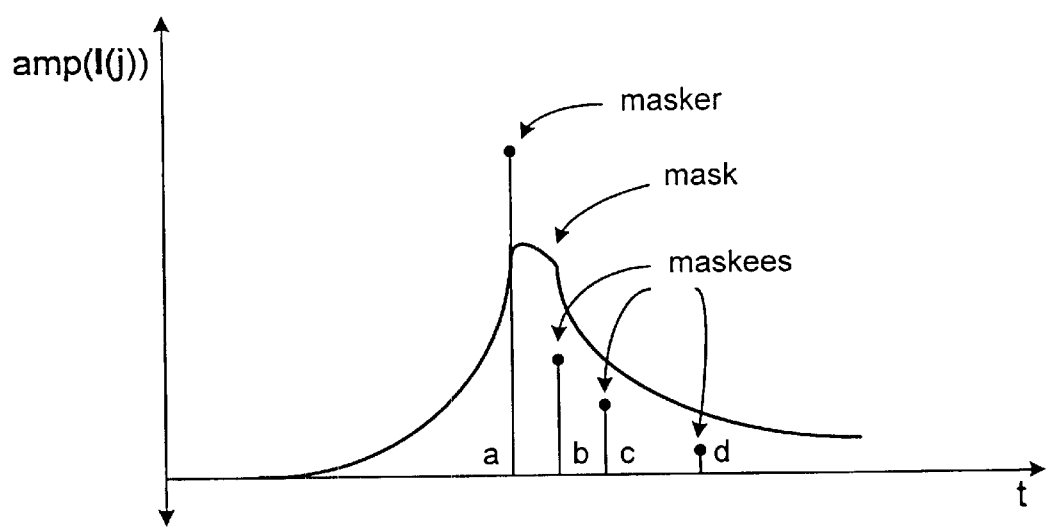
FIG. 5 is a diagram of a perceptual mask.

A masker point $I(j)$ is defined as a point with an intensity value larger than a threshold $\delta$, i.e., $amp(I(j)) \geq \delta$, whereas a maskee point $I(j^k)$ is defined as a point that is under the mask of a masker point $I(j)$, i.e., $amp(I(j^k)) \leq mask(amp(I(j)))$ (see FIG. 5 where sample a is a masker point and samples b, c, & d are maskee points).

In the base domain, the masking ability of a given sample depends on its loudness; while in the spectrum domain, the masking ability of a given signal component depends on its frequency position and its loudness. Empirical results also show that the noise masking threshold at any given frequency is solely dependent on the signal energy within a limited bandwidth neighborhood of that frequency and at any given time is solely dependent on the signal energy within a limited temporal neighborhood. Base domain embedding has much better decoding performance in terms of speed than spectrum domain embedding. However, base domain embedding has lower survivability over compression than does spectrum domain embedding.

There are several methods known to those in the art that can be used to embed bits into the singular and maskee points. Here, as an example is one simple method of embedding a sequence of bits $sb_1, sb_2, \ldots 2b_M$ into the singular bits $Isng_1, Isng_2 \ldots Isng_M$, of a host signal $I_1, I_2, \ldots I_n \ldots I_N$.

Encoding:
  If $I(j)==0$, set $I(j)=I(j)+1$
  If the embedding bit $Sb_m$ is 0 and the mth singular point is $Isng_m$, then set $Isng_1$ to 0.
    If the embedding bit $Sb_m$ is 1, then leave $Isng_m$ unchanged or set $\epsilon_1 \leq Isng_m \leq \epsilon_2$, where $\epsilon_1$ and $\epsilon_2$ are lower and upper bound with $\epsilon_2$ controlled by perceptual mark.

Decoding:
  Let m=1.
  If $I_n=0$ (or $I_n$ is a singular point and $I_n<\epsilon_1$), set $Sb_m$ to 0 and m++.
  If $I_n$ is a singular point (and $I_n \geq \epsilon_1$), set $Sb_m$ to 1 and m++.

The bases of different hidden data layers are preferably orthogonal to each other to ensure maximum detectability. That is, the primary hidden data layer (the active data layer) and the secondary hidden data layers (the error correction data layer and the authentication layer) are each orthogonal to the others. In the presently preferred method, multiple orthogonal features, singular points and maskee points are used to hide the different data layers. Besides assuring the orthogonality of different data layers, this may also increase the data hiding capacity.

The error correction layer requires data hiding capacity in addition to the capacity required for hiding the primary hidden data. Therefore, a small error correction sequence such as 2D or multi-D checksum error correction is desirable. Assume the error correction bit number is Q and the active data stream bit number is M. Then in the case of 2D checksum, the error correction stream length (number of bits) satisfies $M=(Q/2)^2$. For instance, in the preferred embodiment the Java active agent has a data stream length of 4000 bits. The error correction bits needed for the active agent is thus only $64 \times 2 \approx 128$ bits in the case of 2D checksum.

Below, the 2D checksum algorithm is given.

Encoding:
  Let $Q=ceiling[2M^{1/2}]$, i.e., let Q be the smallest integer which is no less than $(2M^{1/2})$.
  Arrange $Sb=SB_1, SB_2, \ldots Sb_M$ into Q/2 chucks $SB(1)=SB(1)_1, SB(1)_2, \ldots Sb_{Q/2}=Sb_1, Sb_2, \ldots Sb_{Q/2}$, $SB(2)=SB(2)_1, SB(2)_2, \ldots SB(2)_{Q/2}=Sb_{Q/2+1}, \ldots Sb_Q \ldots$ and $SB(Q/2)=SB(Q/2)_1, SB(Q/2)_2, \quad . \quad . \quad .$ $SB(Q/2)_{Q/2}=Sb_{(QQ-2Q1/4+1)}, \ldots Sb_M$.
  Let $E_q=LSB(SB(q)_1+SB(q)_2+ \ldots +SB(q)_{Q/2})$ for $q \in (1, Q/2)$ and $E_q=LSB(SB(1)_q+SB(2)_q+ \ldots +SB(Q/2)_q$ for $q \in (Q/2, Q)$, where $LSB(s)$ denotes the least significant bit of S.

Decoding is similar to the encoding process.

The preferred embodiment employs an authentication scheme similar to that described by C. W. Wu et. al. in *Fragile imperceptible digital watermark with privacy control*, Proc. SPIE'99, vol. 3657, in which the authors suggested placing the authentication value into the least significant bit of each sample. In the preferred embodiment, to ensure orthogonality, $\epsilon$ is set to 2 or larger for both singular points embedding and maskee points embedding.

A brief outline of the algorithm is described below:
  Choose verification block size B and dependent block size D (for example, B=128 & D=512 bits). Assume the host signal is a 16 bits audio, concatenating all the high bits (all the bits except the least significant bit) of the 512 samples yields a message Mb of $15 \times 512=7680$ bits. Now by further concatenating a key of 512 bits (or a key of shorter length which is padded to 512 bits (or a key of shorter length which is padded to 512 bits), a message MB of 8192 bits is produced.
  Compute the one way hash with the MD5 algorithm, MB'=h=H(MB) to generate a 128 bits message. (Append time or other data if B>128 bits.)
  Use public key (or secret key, depending on the application) cryptography method and signing MB' with secret key K, MB"=Sgn(K, MB').
  Insert B bits message MB" into the least significant bit of each sample, from $1 \rightarrow 0$ if embedding 0 or $0 \rightarrow 1$ if embedding 1, into the verification block.

Decoding is done similarly with the public key and an XOR operation to check the authenticity of the signal.

From the foregoing it will be understood that the invention provides a system that permits the simultaneous achievement of multiple data hiding goals. For example, if both access control bits (passive data stream) and active data stream are embedded into the host signal, both playback/ record control and feedback can be achieved. Also, if the active data stream is encrypted, the encryption key may also be embedded with multi-layer data hiding. Similarly, for the multi-purpose case, additional control information can be embedded such as the quantity of bits that are embedded in the media, decoding data to ensure proper extraction of the primary hidden data and also to allow maximum capacity. With an additional control data layer, different capacity in different images may be achieved based on the analysis of each image. Those images that contain large coarse regions may be embedded with more data while the ones with fewer coarse regions will be embedded with less data. Similarly, data hiding capacity for frame based video and other media may also be controlled by employing the principles of the invention. Furthermore, a practical system for the systematic conveying hidden information is better structured by using multi-layer data hiding. For example, the data hiding system clarifies and separates various elements in data hiding permitting data hiding systems for particular applications to be optimized. Accordingly, the multi-layer data hiding system provides a data hiding system the achieves improved controllability, a flexible robustness-capacity tradeoff, achieves multiple purposes simultaneously, and provides a coherent system level structure.

In summary, where and how to hide each layer of data and how many data layers are needed depends on the application and the medium type. Multiple layers of data may be hidden into the same domain in one application but in several different domains in another.

While the invention has been described in its presently preferred embodiment in order to afford an enlightened understanding of the invention, and to describe its principles, it will be understood that the invention can be implemented in different ways without departing from the spirit of the invention as set forth in the appended claims.

What is claimed is:

1. A method of embedding hidden data into host data having a media unit, comprising the steps of:
   evaluating the media unit of the host data;
   assessing the data hiding capacity of said media unit and selecting at least one embedding space and at least one embedding algorithm to accommodate multiple data hiding goals associated with two different hidden data layers;
   embedding a ruling layer of primary hidden data into the media unit; and
   embedding at least one governing layer of secondary hidden data on top of the ruling layer of primary hidden data, such that embedding the primary and secondary hidden data into the host data generates embedded data, wherein the governing layer of secondary hidden data provides control information for controlling the primary hidden data and the host data.

2. The method of claim 1 further comprising the step of mapping the primary hidden data into a bitstream before embedding into the media unit.

3. The method of claim 1 wherein the secondary hidden data is selected from the group of: error correction data, identification data, access control data, keys, management rules, synchronization data, decoding data, and authentication data.

4. The method of claim 1 wherein the steps of embedding further comprise employing an embedding scheme selected from the group of: base domain embedding and spectrum domain embedding.

5. The method of claim 1 further comprising the step of selecting an embedding technique wherein the secondary hidden data is embedded substantially noninterfering with the primary hidden data.

6. The method of claim 5 wherein the embedding technique is selected from the group of: substantially noninterfering features extracted from the same domain, substantially noninterfering subbands, substantially noninterfering frames, and substantially noninterfering embedding domains.

7. The method of claim 1 wherein the steps of embedding further include the step of controllably varying the quantity of bits that are embedded into the media unit.

8. The method of claim 1 wherein the steps of embedding further include the step of embedding the hidden data into a plurality of media units.

9. The method of claim 1 wherein the media unit is selected from the group of: frames of video, frames of audio, and images.

10. The method of claim 1 wherein the at least one governing layer is subjected to a quantity of distortion, and wherein the step of embedding at least one governing layer comprises the steps of;
    evaluating the quantity of distortion to which the at least one governing layer is subjected;
    selecting an embedding scheme based upon the quantity of distortion; and
    using the selected embedding scheme to embed the at least one governing layer.

11. The method of claim 1 wherein the step of embedding at least one governing layer comprises the steps of using spectrum domain embedding to embed a first governing layer and using sub-band embedding to embed a second governing layer.

12. The method of claim 1 wherein the primary hidden data is selected from the group of: passive data and active data.

13. The method of claim 1 further comprising the step of decoding the embedded data.

14. The method of claim 13 wherein the step of decoding further comprises the steps of:
    decoding the governing layer, such that the secondary hidden data is extracted from the embedded data; and
    decoding the ruling layer, such that the primary hidden data is extracted from the embedded data.

15. A method of embedding hidden data into host data having a media unit, comprising the steps of:
    evaluating the media unit of the host data;
    mapping primary hidden data into a bitstream
    selecting a first embedding scheme to embed a ruling layer of the primary hidden data into the media unit;
    using base domain embedding to embed the ruling layer;
    selecting a second embedding scheme to embed at least one governing layer of secondary hidden data into the media unit;
    selecting an embedding technique so that the embedded secondary hidden data is substantially noninterfering with the primary hidden data; and
    using the second embedding scheme to embed the at least one governing layer of secondary-hidden data on top of the ruling layer of embedded data, wherein the governing layer of hidden data includes error correction data for controlling the operation of the primary hidden data.

16. A data hiding system for embedding hidden data into host data, comprising:
- a media assessor that assesses the data hiding capacity of said media unit and selects at least one embedding space and at least one embedding algorithm to accommodate multiple data hiding goals associated with two different hidden data layers;
- a bit stream generator for converting primary hidden data into a bitstream;
- a ruling layer encoder for embedding at least one ruling layer of the primary hidden data bitstream into a media unit of the host data, wherein ruling layer encoded data is generated;
- a control data generator for generating secondary hidden data from the primary hidden data and the ruling layer encoded data; and
- a governing layer encoder for embedding at least one governing layer of the secondary hidden data into the ruling layer encoded data, such that embedded data is generated.

17. The data hiding system of claim 16 wherein the primary hidden data is selected from the group of: passive data and active data.

18. The data hiding system of claim 16 wherein the media unit is selected from the group of: frames of video, frames of audio, and images.

19. The data hiding system of claim 16 wherein the secondary hidden data is selected from the group of: error correction data, synchronization data, identification data, keys, access control data, management rules, and authentication data.

20. The data hiding system of claim 16 wherein the secondary hidden data is embedded orthogonal to the primary hidden data.

21. A method: of embedding hidden data into host data having a media unit, comprising the steps of:
- evaluating the media unit of the host data;
- embedding a ruling layer of primary hidden data into the media unit; and
- embedding at least one governing layer of secondary hidden data on top of the ruling layer of primary hidden data, such that embedding the primary and secondary hidden data into the host data generates embedded data, wherein the governing layer of secondary hidden data provides control information for controlling the primary hidden data and the host data;
- wherein the at least one governing layer is subjected to a quantity of distortion, and wherein the step of embedding at least one governing layer comprises the steps of;
  - evaluating the quantity of distortion to which the at least one governing layer is subjected;
  - selecting an embedding scheme based upon the quantity of distortion; and
  - using the selected embedding scheme to embed the at least one governing layer.

22. A method of embedding hidden data into host data having a media unit, comprising the steps of:
- evaluating the media unit of the host data;
- embedding a ruling layer of primary hidden data into the media unit; and
- embedding at least one governing layer of secondary hidden data on top of the ruling layer of primary hidden data, such that embedding the primary and secondary hidden data into the host data generates embedded data, wherein the governing layer of secondary hidden data provides control information for controlling the primary hidden data and the host data; and
- wherein the stop of embedding at least one governing layer comprises the steps of using spectrum domain embedding to embed a first governing layer and using sub-band embedding to embed a second governing layer.

* * * * *

UNITED STATES PATENT AND TRADEMARK OFFICE
CERTIFICATE OF CORRECTION

PATENT NO.      : 6,456,726 B1
DATED           : September 24, 2002
INVENTOR(S)     : Hong Heather Yu et al.

It is certified that error appears in the above-identified patent and that said Letters Patent is hereby corrected as shown below:

Title page,
Item [56], References Cited, U.S. PATENT DOCUMENTS, Patent No. 6,128,736 A1: "2/2001" should be -- 10/2000 --.

Column 8,
Line 25, ";" should be -- : --.
Line 63, "secondary-hidden" should be -- secondary hidden --.

Column 9,
Line 36, delete ":".

Signed and Sealed this

Twenty-fourth Day of June, 2003

JAMES E. ROGAN
*Director of the United States Patent and Trademark Office*